(No Model.)

R. C. WILLIAMSON.
TRACE COUPLING.

No. 460,806. Patented Oct. 6, 1891.

Witnesses.

Inventor.
R. C. Williamson
by Charles H. Riches
Attorney.

UNITED STATES PATENT OFFICE.

ROBERT C. WILLIAMSON, OF TORONTO, CANADA.

TRACE-COUPLING.

SPECIFICATION forming part of Letters Patent No. 460,806, dated October 6, 1891.

Application filed January 29, 1891. Serial No. 379,571. (No model.)

*To all whom it may concern:*

Be it known that I, ROBERT C. WILLIAMSON, a subject of the Queen of Great Britain, and a resident of the city of Toronto, in the county of York and Province of Ontario, Canada, have invented certain new and useful Improvements in Couplings for Traces; and I hereby declare that the following is a clear, full, and exact description of the same.

The object of this invention is to devise a coupling by means of which traces may be quickly and easily connected and disconnected; and it consists, essentially, of the device hereinafter more fully explained, and more particularly pointed out in the claim.

Figure 3:
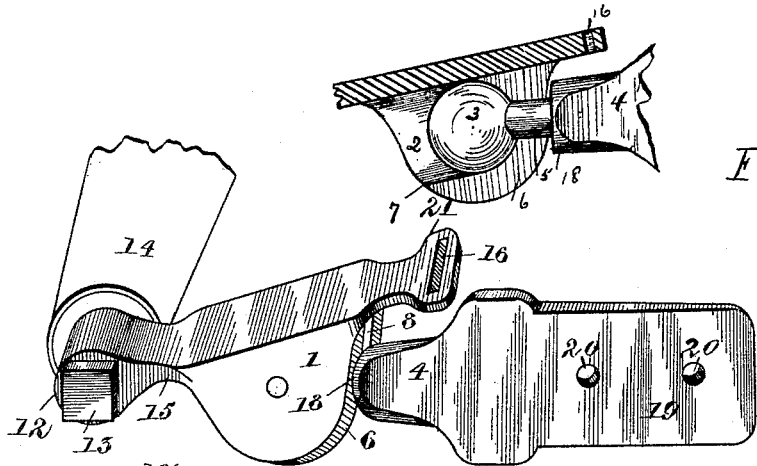
Figure 1:
Figure 2:
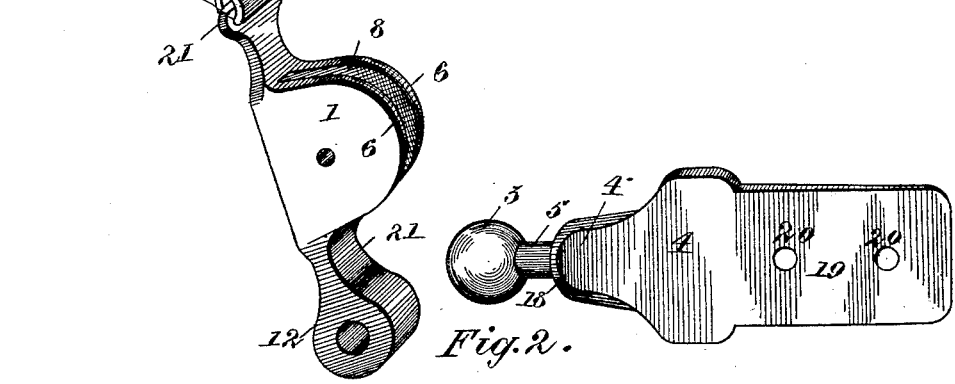
Figure 5:
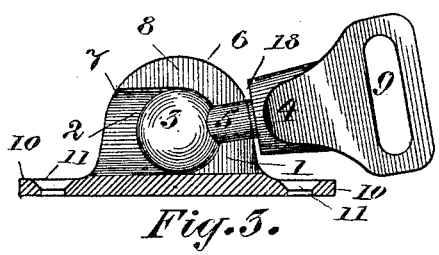
Figure 4:
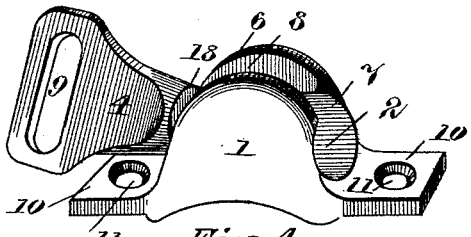

In the drawings, Figure 1 is a perspective view of my device. Fig. 2 is a view of the same, showing the several parts in the act of separation; and Fig. 3 is a longitudinal sectional view.

Like letters of reference refer to like parts throughout the several views.

The device consists, essentially, of the body 1, in which is formed a socket 2. The socket is slightly larger in diameter than the diameter of the ball 3. The length of the stem 5 hereinafter referred to, is slightly longer than the thickness of the metal between the socket 2 and the edge 6 of the body 1. The socket 2 is provided with an opening 7 to permit the insertion of the ball 3, and is also provided with a slot 8, extending from the top of the opening 7 around to the bottom of its front side.

The rear end of the body 1 has connected thereto, by means of a neck 15, a collar 12. Through this collar passes a bolt 13, securing the same to the end of the whiffletree 14. This collar is sufficiently loose upon bolt 13 to permit the head to freely revolve on the same; but at the same time it is sufficiently tight to prevent any side motion which will cause noise and rattling. The end of the body opposite the collar 12 is fitted with an extension-arm 21, provided with a slot 16, to which is connected a strap 17, carried back to the body of the carriage.

The head 4, it will be seen from the drawings, is formed with a ball 3, connected to the head by a stem 5 and having an enlarged shoulder 18 and a riveting-shank 19, in which is formed any number of rivet-holes 20, so that the trace may be riveted to said shank. The shoulder 18 upon stem 5 is adapted to bear against the edges of the slot 8, formed in body 1, and prevents said head slipping through slot 8 into socket 2.

By the employment of my improved form of coupling a horse may be rapidly and securely hitched to a vehicle. In case of a runaway or accident of any description, by pulling on the straps 17 the body 1 of the coupling is pulled into a vertical or nearly vertical position, (shown in Fig. 2,) which allows ball 3 to drop from socket 2, releasing the traces from the whiffletree, while the horse in its forward movement carries the head 4 of the coupling forward with it until ball 3 is carried from socket 2, thus completely freeing the horse from the vehicle.

Having thus fully described my invention, what I claim as new, and desire to secure by Letters Patent, is—

In a coupling, the combination of a horizontal plate or body, one end adapted to be pivotally connected to the whiffletree and formed or provided at or near its center with a depending bifurcated portion, the inner faces thereof provided with opposite elongated cavities forming sockets having their rear ends open, a head provided at its rear end with an annular stop or shoulder and a stem extending therefrom, the latter formed or provided with a ball fitting in the cavities of the depending bifurcated portion, and a releasing-strap secured to the free end of the pivoted plate or body and adapted when a pull is given thereto to bring said plate or body to an approximately vertical position, so as to permit the ball to drop out of the open ends of the sockets, substantially as set forth.

Toronto, January 20, 1891.

ROBERT C. WILLIAMSON.

In presence of—
C. H. RICHEY,
M. E. ANGELL.